Jan. 19, 1932.    C. A. MARTIN ET AL    1,841,749
THERMOSTATIC CONTROL DEVICE FOR CARBURETORS
Original Filed May 10, 1927    2 Sheets-Sheet 1

Witnesses
C. E. Churchman
Wm. R. Smith

Carl A. Martin
William Orth
INVENTOR.

BY Richard B. Owen
ATTORNEYS.

Jan. 19, 1932.   C. A. MARTIN ET AL   1,841,749
THERMOSTATIC CONTROL DEVICE FOR CARBURETORS
Original Filed May 10, 1927    2 Sheets-Sheet 2
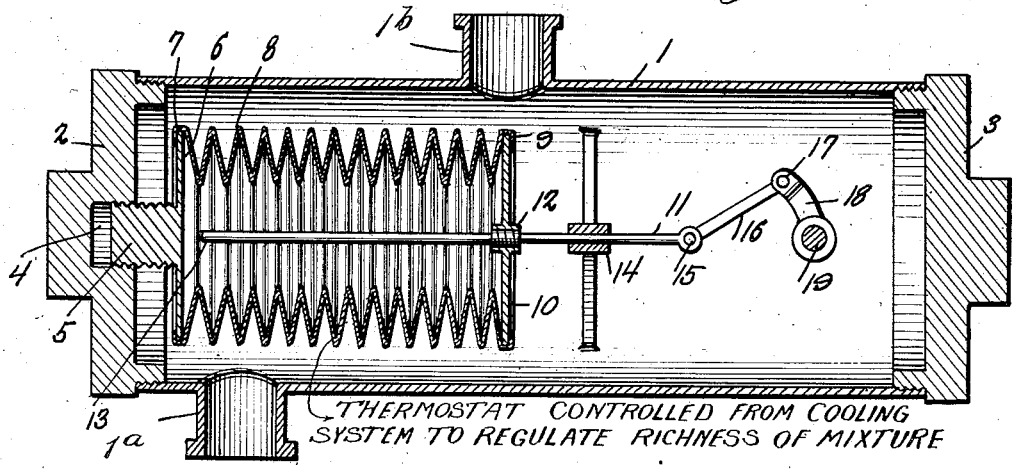
THERMOSTAT CONTROLLED FROM COOLING SYSTEM TO REGULATE RICHNESS OF MIXTURE
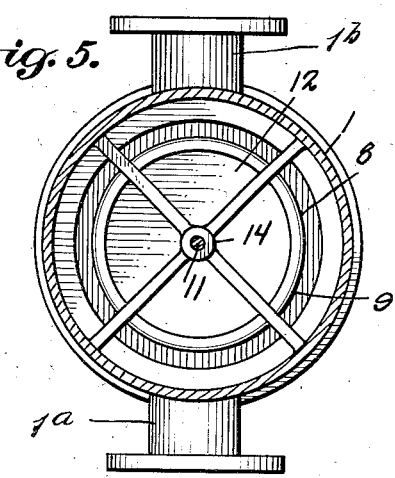
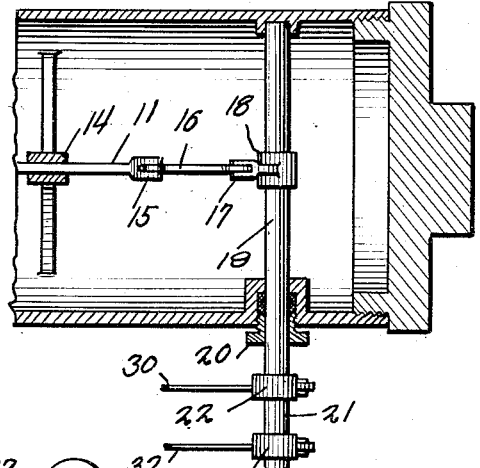
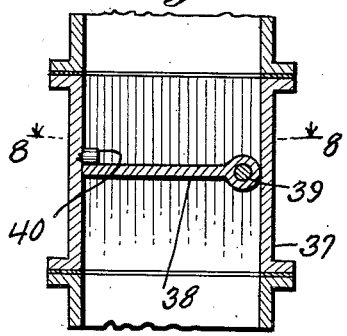
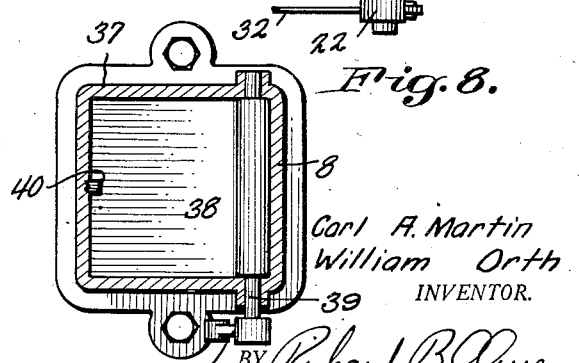
Carl A. Martin
William Orth
INVENTOR.
BY Richard B. Owen
ATTORNEYS.
Witnesses
C. C. Churchman
Wm. R. Smith Patented Jan. 19, 1932

1,841,749

UNITED STATES PATENT OFFICE

CARL AUGUST MARTIN AND WILLIAM ORTH, OF GENOA, COLORADO

THERMOSTATIC CONTROL DEVICE FOR CARBURETORS

Application filed May 10, 1927, Serial No. 190,285. Renewed August 23, 1930.

This invention relates to a thermostatic control device for carbureters, and has for its primary object the construction of a device that will automatically control the richness of a mixture entering the internal combustion engine according to the temperature of the latter by accurately controlling the fuel supply and the air supply to the carburetor.

An object of the invention is the construction of a device that may be secured to the internal combustion engine in direct communication with the cooling system thereof so that the temperature of the device will be controlled according to the temperature of the engine and thereby accurately control the fuel supply to the engine according to the temperature of the latter.

Another object of the invention is the utilization of a bellows or coil type of thermostat completely enclosed in a housing that communicates with the cooling system so that the temperature thereof will vary proportionately to the temperature of the engine so that the expansible and contractile action of the thermostat may be utilized to accurately and proportionately operate the air valve and needle valve of a carburetor to regulate the mixture of the fuel entering the engine according to the temperature of the latter.

Still another object of the invention is the provision of mechanism for accurately controlling the flow of fuel to a motor, the action of which is under the control of the exhaust gases passing from the motor.

Besides the above, our invention is distinguished in the combination of three control devices, two controlling the movement of the air valve and fuel valve of the carburetor and the third controlling the regulation of one of the other devices, thereby more sensitively controlling the operation of the carbureter according to the temperature of the engine.

A feature of our invention is the novel manner of connecting the needle valve and air valve of a carburetor with a thermostat which is under the control of the heat of the engine and providing a separate device under the control of the exhaust gases for regulating the control of the air valve of the carbureter by the thermostat.

With these and other objects in view, our invention will be better understood from a description of the same when taken in connection with the accompanying drawings, wherein:—

Figure 4 is a longitudinal sectional view through the housing and associated parts;

Figure 5 is a transverse sectional view of the housing;

Figure 6 is a fragmentary horizontal sectional view of the housing;

Figure 7 is a sectional view through the exhaust flap valve and associated parts;

Figure 8 is a horizontal sectional view on the line 8—8 of Figure 7.

Figure 1:
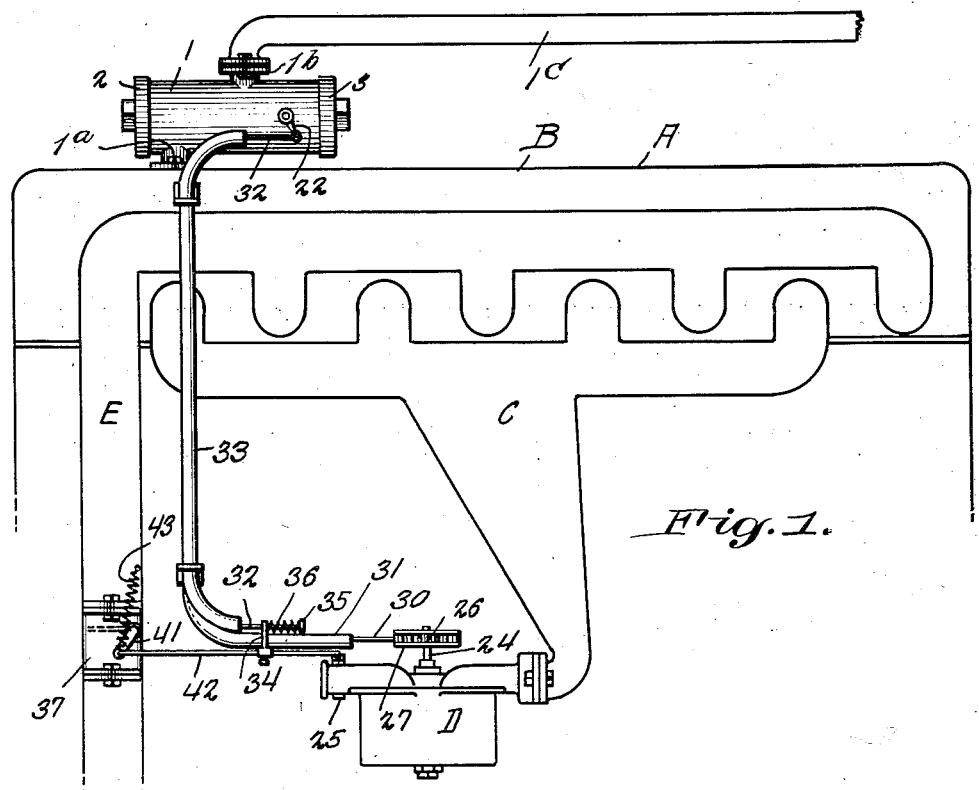
Figure 1 is a diagrammatic view of an engine showing our invention applied thereto.
Figure 2:
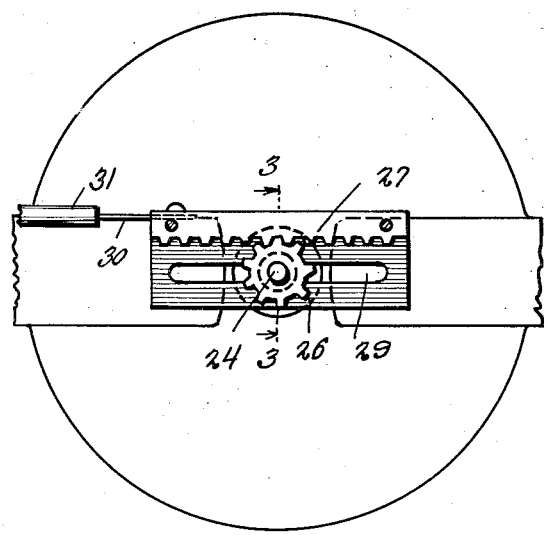
Figure 2 is a top plan view of a carbureter with certain parts of our improved device connected thereto.
Figure 3:
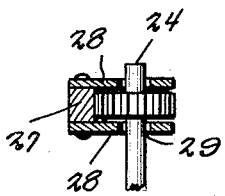
Figure 3 is a sectional view on the line 3—3 of Figure 2.

Again referring to the drawings illustrating one of the many constructions of our invention, the letter A designates in a diagrammatic manner an internal combustion engine including the water jacket B of a cooling system. The intake manifold C communicates with any suitable type of carbureter D for supplying fuel to the engine, the exhaust gases of which pass through the exhaust pipe E.

Our novel thermostatic control device for carbureters consists of a housing 1, shown in this particular instance as of cylindrical formation, having detachably secured to the ends thereof the end plates 2 and 3, the former provided with a threaded recess 4 for adjustably receiving the plug 5 carried on the disk 6 that is in turn rigidly secured to the fixed end 7 of the bellows or coil type of thermostat 8. The housing 1 is provided with an inlet spud 1a connected to the water jacket B, and with an outlet spud 1b connected with a pipe 1c to the radiator, not shown, of the cooling system. The free end 9 of the thermostat is rigidly secured to a disk 10, to which is attached the central portion of the rod 11, as indicated at 12. One end 13 of this rod is spaced a predetermined distance from the plug 5 so as to act in the capacity of a stop for limiting the contractile action of the thermostat, thereby presenting a maximum surface to the circulating water within the housing to assure instant operation thereof in accordance with the change of temperature of the motor. This rod 11 is slidably mounted in a spider type of guide 14 and has a pivotal connection 15 with a link 16 that in turn has a pivotal connection 17 with an arm 18 secured to the operating shaft 19. This shaft is rotatably mounted in the casing in any suitable manner and includes a stuffing box 20 to assure a liquid-tight connection for the protruding end 21 of the shaft. This protruding end of the shaft has any suitable number of arms 22 secured thereto, depending upon the various operations to be accomplished in the movement of the shaft.

In this particular case, we have shown two arms 22, as the shaft 19 is utilized to operate the needle valve 24 and air valve 25 of the carbureter D in accordance with the change in temperature of the engine, that is to say, the valve 24 is adjusted to supply a richer mixture when the engine is cool and the valve 25 is operated to cut off the air supply when the engine is cool and to reverse such operations when the temperature of the engine increases.

To accomplish this desired result, the needle valve 24 has connected thereto a gear 26 constantly meshing with a rack 27 that is mounted between the opposing spaced guides 28, each of which is provided with a slot 29 accommodating the needle valve 24. The rack 27 may be directly connected to or operate in any suitable manner from the shaft 19, but in the drawings we have illustrated a control wire 30 threaded through the support tube 31 and with its ends connected respectively to the rack 27 and one of the arms 22. A second control wire 32 is also threaded through a support tube 33 and has one end secured to the remaining arm 22 and its other end passed through a bracket 34 and terminating in the head 35, between which and the bracket is arranged a control spring 36. Thus it will be appreciated that the control wire may actuate the bracket 34 during the contraction of the thermostat but the bracket is capable of movement independently of the control wire 32 when the thermostat is contracted to accomplish the novel action now to be described.

Arranged in the exhaust pipe E is a section 37 which forms a housing for a flap valve 38 that is fixed to a stub shaft 39 and contacts with a stop 40 when in closed position. An arm 41 is fixed to the shaft 39 at an angle to the valve 38, and is directly connected to the valve 25 by a link 42 to which the bracket 34 is fixed. The arm 41 extends downwardly from the shaft when the valve 38 is closed and outwardly beyond the shaft when the valve is opened. A spring 43 which is secured to the free end of the arm 41 and to the pipe section 37 at a point above the shaft 39, functions to yieldingly hold the valves 25 and 38 in closed or opened position.

The connections between the thermostat and the valves 24, 25 and 38 are such that the contraction of the thermostat moves the valve 24 in the direction of its opened position and the valves 25 and 38 in the direction of their closed position. These connections are also such that the expansion of the thermostat moves the valve 24 in the direction of its closed position and releases the valve 25 and 38 for movement in the direction of their opened position. The valves 25 and 38 are, when released, moved into their opened position by the action of the exhaust gases against the valve 38. The action of the exhaust gases against the valve 38 moves this valve downwardly, and the connection between this valve and the valve 25 is such that the downward or opening movement of the valve 38 effects movement of the valve 25 into opened position.

When the thermostat is contracted, the spring 36 permits the valves 25 and 28 to be moved in the direction of their opened position by the action of the exhaust gases against the valve 38. The spring 36 also permits the valves 25 and 28 to be released by and as the result of the expansion of the thermostat.

From the foregoing description taken in connection with the accompanying drawings, it will be apparent that when the engine is idle and cool, the temperature of the water within the housing will be cool and as a result the thermostat has contracted to a position to move the needle valve into maximum open position and the valves 25 and 38 into closed position. As a result, upon initial starting of the engine a very rich charge will be drawn into the cylinder. Immediately the engine starts to fire, the exhaust gases passing through the exhaust pipe will act upon the flap valve 38 and partly open it and the valve 25 against the tension of the spring 36 and 43 to assure the proper mixture of air and fuel that are passing to the engine. It is, of course, to be understood that just as soon as the temperature of the cooling system of the engine increases to the proper degree, the thermostat will expand and move the valve 24 in the direction of its closed position and free the valves 25 and 38 for movement into fully opened position by the action of the exhaust gases against the valve 38. The valves 25 and 38, after being opened will be held in such position by the spring 43 against accidental closing.

It is, of course, to be understood that the device may be designed and constructed in various other manners than illustrated, depending upon the position of the device and the particular type of motor to which the device is attached, but we wish to lay particular stress upon the fact that the rod 42 may be positioned in alignment with the carbureter or exhaust pipe to provide a direct connection, or the various other parts may be changed in other ways to increase or decrease the number of connections, depending upon which is the most advantageous in practice, and, therefore, we do not desire to be limited in any respect except as set forth in the following claims.

We claim:—

1. A thermostatic control device for carbureters comprising a housing for communication with the cooling system of an automobile, a thermostat arranged within the housing, connections between the thermostat, needle valve and air valve of the carbureter whereby the needle valve and air valve will be simultaneously operated according to the movements of the thermostat, and exhaust gas operated means varying the control of the air valve by said thermostat.

2. A thermostatic control device for carbureters comprising a housing for communication with the cooling system of an automobile, a thermostat arranged within the housing, connections between the thermostat, needle valve and air valve of the carbureter whereby the needle valve and air valve will be simultaneously operated according to the movements of the thermostat, and means adapted to be positioned in the exhaust pipe to be actuated by the exhaust gases for variably relieving the control of the air valve by said connection.

3. A thermostatic control device for carbureters comprising a closed housing communicating with the cooling system of an automobile engine, a thermostat mounted within the housing, link mechanism connected to the thermostat to be actuated thereby, flexible connections between said mechanism, the needle valve and air valve of the carbureter for actuating the same in unison with the movement of the thermostat, a flap valve adapted to be arranged in the exhaust pipe of the engine, and a connection between the flap valve and said air valve whereby the actuation of the latter by said flexible connection may be variably controlled.

4. A thermostatic control device for carbureters comprising a housing arranged to be heated according to the temperature of an internal combustion engine, a thermostat having one end adjustably connected to the interior of the housing, a rod fixed to the free end of the thermostat and spaced a predetermined distance from the fixed end of the thermostat to regulate the contractile action of the thermostat, actuating means arranged between the rod and the needle valve of the carbureter, actuating means arranged between the rod and the air valve of the carbureter, and exhaust control means operatively associated with said air valve and with the air valve actuating means whereby the extent of movement of the air valve by the air valve actuating means can be variably controlled.

5. A thermostatic control device for carbureters comprising a housing arranged to be heated according to the temperature of an internal combustion engine, a thermostat having one end adjustably connected to the interior of the housing, a rod fixed to the free end of the thermostat and spaced a predetermined distance from the fixed end of the thermostat to regulate the contractile action of the thermostat, actuating means arranged between the rod and the needle valve of the carbureter, actuating means arranged between the rod and the air valve of the carbureter, exhaust control means operatively associated with said air valve and with the air valve actuating means whereby the extent of movement of the air valve by the air valve actuating means can be variably controlled, said exhaust control means including a flap valve arranged to be struck by exhaust gases, and a yieldable connection between the flap valve and said air valve actuating mechanism.

6. A thermostatic control device for carbureters comprising, in combination with the cooling system, exhaust pipe and carbureter of an internal combustion engine, a housing mounted to communicate with the cooling system to have its temperature regulated thereby, a thermostat mounted within the housing, a rod secured to the thermostat, an actuating shaft having an operative connection with said rod, a gear secured to the needle valve of the carbureter, a rack meshing therewith, a control wire operatively connecting said rack to said shaft, a flap valve in the exhaust pipe to be operated by the gases passing therethrough and having a link connection with the air valve of the carbureter, a bracket adjustably secured to the link mechanism, and a control rod operatively connected to said shaft and associated with said bracket.

7. In an internal combustion engine, in combination with the fuel and air valves thereof, of a thermo-sensitive means for moving the fuel valve in the direction of its fully opened position and the air valve in the direction of its fully closed position during the cooling of the engine, said means being adapted to release the air valve and move the fuel valve in the direction of its fully closed position during the heating of the engine, and fluid actuated means functioning independently of said first means and adapted to automatically move the air valve into partly opened position before it is released and into fully opened position after it is released.

8. In an internal combustion engine, in combination with the fuel and air valves thereof, of a thermo-sensitive means for moving the fuel valve in the direction of its fully opened position and the air valve in the direction of its fully closed position during the cooling of the engine, and means under the control of the exhaust gases of the engine and functioning independently of said first means and adapted to automatically move the air valve into partly opened positioned before it is released and into fully opened position after it is released.

In testimony whereof we affix our signatures.

CARL AUGUST MARTIN.
WILLIAM ORTH.